Nov. 22, 1966    J. B. TEED    3,287,175
BATTERY ACID LEVEL INDICATOR
Filed Oct. 10, 1963    2 Sheets-Sheet 1
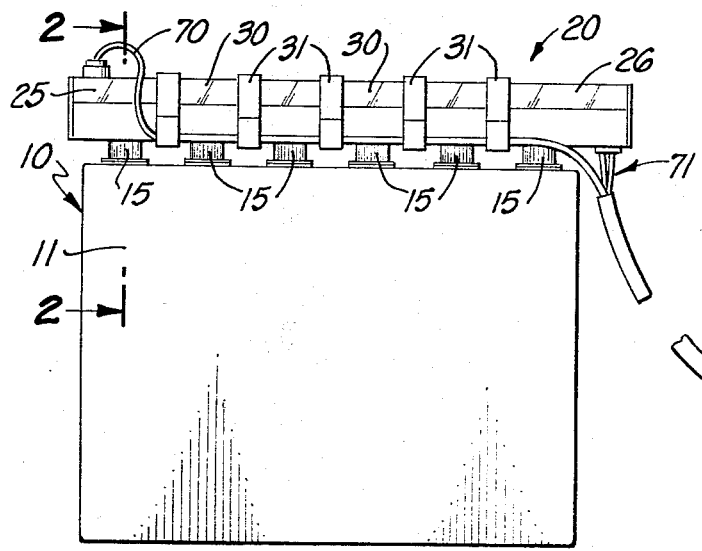
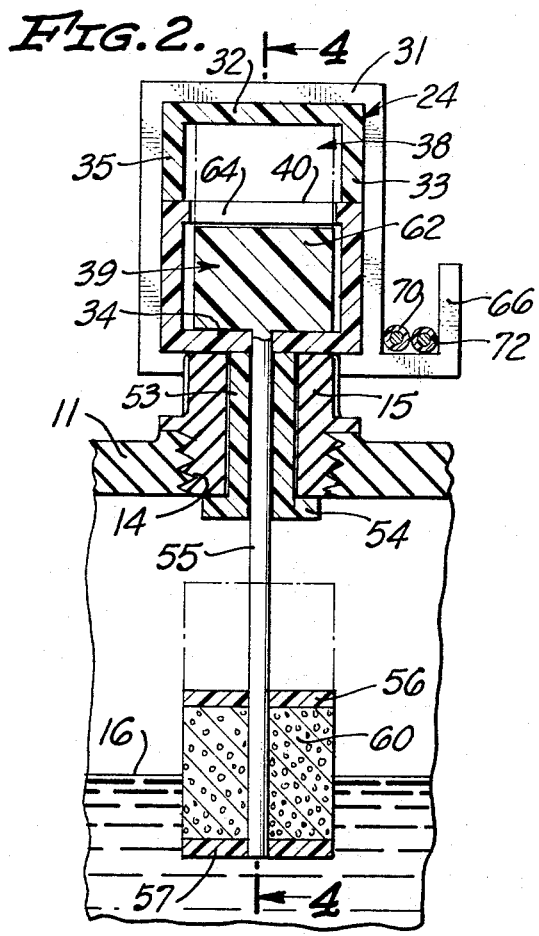
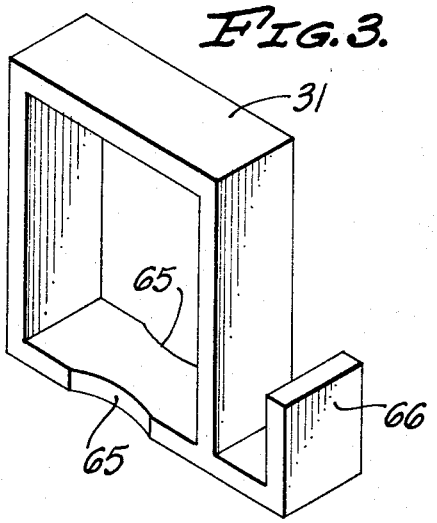
INVENTOR.
JOHN B. TEED
BY Herbert E. Fidder
AGENT

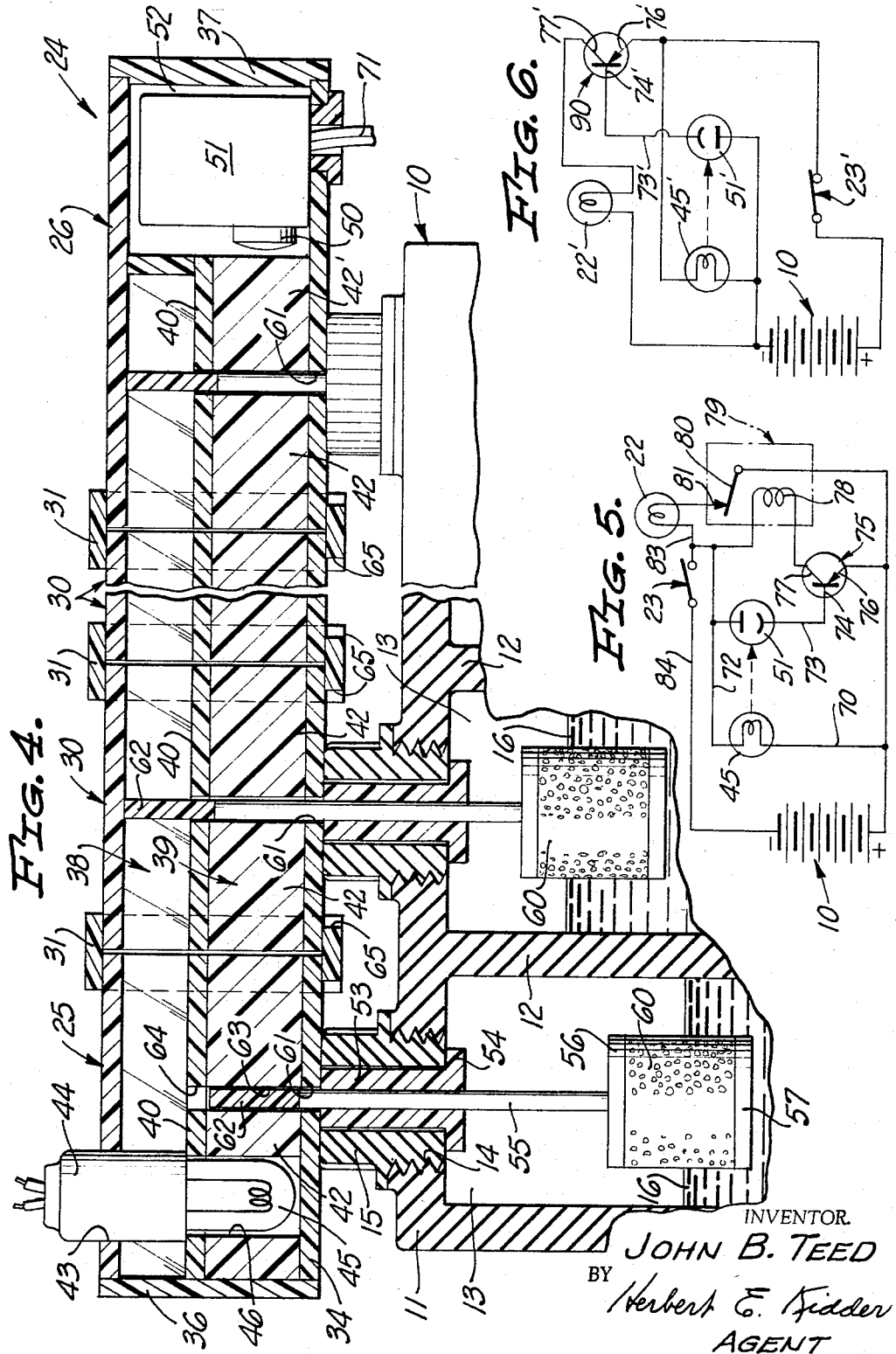

United States Patent Office 3,287,175
Patented Nov. 22, 1966

1

3,287,175
BATTERY ACID LEVEL INDICATOR
John B. Teed, 2258 W. Court St., San Bernardino, Calif.
Filed Oct. 10, 1963, Ser. No. 315,209
5 Claims. (Cl. 136—182)

The present invention relates to a device for indicating that the acid level in at least one cell of a storage battery is below the safe level, and the primary object of the invention is to provide an indicator that functions to alert an operator to the fact that the battery requires servicing, and should have water added to one or more cells. The invention finds its greatest utility where the battery is mounted in a relatively remote or inconvenient location, and is not subjected to frequent inspections.

Another object of the invention is to provide a device of the class described that is electronically operated by means of a transistor to actuate a warning lamp or buzzer at a point remote from the battery, and which is also characterized by the low current drain and long, trouble-free service life.

Still a further object of the invention is to provide a battery acid level indicator that is simple and inexpensive to manufacture, and which does not interfere with the normal operation or servicing of the battery.

These and other objects and advantages of the present invention will become apparent to those skilled in the art upon consideration of the following detailed description of the preferred embodiment thereof, reference being had to the accompanying drawings, wherein:

FIGURE 1 is a side elevational view of a battery having an acid level indicator embodying the principles of my invention mounted thereon;

FIGURE 2 is an enlarged fragmentary sectional view, taken at 2—2 in FIGURE 1;

FIGURE 3 is a perspective view of one of the connectors between the separate units of the invention;

FIGURE 4 is an enlarged fragmentary sectional view through the device of the invention, taken at 4—4 in FIGURE 2;

FIGURE 5 is a schematic diagram of the electrical circuit; and

FIGURE 6 is a schematic diagram of another form of electrical circuit for the invention.

In the drawing, a 12-volt storage battery is designated in its entirety by the reference numeral 10, and comprises the usual rectangular, box-like case 11, which is divided internally by partitions 12 into a plurality of cells 13. There are six cells 13 in the 12-volt battery illustrated in the drawings, although the number of cells and the voltage of the battery are of no consequence as far as the invention is concerned.

Each of the cells 13 has an internally threaded filler opening 14, at the top, and these openings are arranged in a straight line. A filler cap 15 is screwed into each of the openings 14. The cells 13 contain plates (not shown) which are immersed in acid 16, and the plates of each cell are connected in series with the plates of the adjoining cells, in the usual manner.

The device of the present invention comprises an operating unit 20 mounted on top of the battery 10, and a signaling unit 21 mounted at a convenient location where it will readily be seen by the operator. In the case of a car or boat, the signalling unit 21 would preferably be mounted on the instrument panel or dashboard. The signaling unit 21 may consist of any form of indicating device, such as a warning light 22, as shown in the drawings, or a buzzer, or the like. A switch 23 is also shown in FIGURE 1, although this switch could be embodied in the ignition switch of a car or boat.

The operating unit 20 consists of an elongated housing 24 disposed directly above the filler openings 14 and extending from one end of the battery to the other. The housing 24 is essentially a square tube, made up of end sections 25 and 26 and intermediate sections 30, all abutting against one another and held in alignment by means of coupling members 31. Each of the housing sections 25, 26, 30 is preferably made of opaque plastic, and has four thin-walled sides 32, 33, 34 and 35, which are joined together along their edges to form an open-ended, box-like structure. The outer ends of the two end sections 25, 26 are closed by end plates 36 and 37, respectively. Each of the housing sections is divided internally by a horizontal partition (also of opaque plastic), 40, which divides the sections into upper and lower compartments 38 and 39, respectively. Each of the lower compartments 39 is filled with a block 42 of clear, transparent plastic, such as methyl methacrylate, which has exceptional light-transmitting properties.

Projecting down through a hole 43 in the top of end section 25 near the outer end thereof, is a light socket 44 into which is screwed a lamp 45. The lamp 45 projects down into a cylindrical cavity 46 in the transparent block 42, and light from the lamp 45 is transmitted through the aligned blocks 42 to the far end of the other end section 26, where it impinges upon the photosensitive element 50 of a photoelectric cell 51. The photoelectric cell 51 is contained within a cavity 52 at the outer end of the housing section 26, and the light-transmitting block of plastic 42' for that section terminates just ahead of the photosensitive element 50.

Each of the housing sections 25, 26, 30 is attached to its respective filler cap by means of a tubular sleeve 53, of plastic, which is affixed to the bottom side 34 of the housing section and projects downwardly therefrom. A radially outwardly projecting flange 54 at the bottom end of the tubular sleeve 53 engages the underside of the filler cap 15 to prevent separation therefrom. The filler cap 15 turns freely on the sleeve 53 to permit screwing the same into the filler opening 14. Slidable vertically through the hollow bore of the tubular member 53, is a slender rod 55 having two vertically spaced washers 56, 57 attached to the bottom end thereof. Mounted on the vertical rod 55 between the washers 56 and 57 is a cylindrical body of foamed plastic 60, which constitutes a float that is normally immersed in the acid 16 of the battery cell. The rod 55 projects upwardly from the tubular sleeve 53 through the aperture 61 in the bottom plate 34, and fixed to its top end is an opaque flag 62, which is normally elevated into the upper compartment 38 of the housing section when the battery acid level is at its proper height. However, the flag 62 is adapted to drop down into a slot 63 in the solid plastic block 42 in the lower compartment 39 of the section when the acid level drops below the safe level. This condition is shown in solid lines in FIGURE 2, and also in the cell at the left-hand end of FIGURE 4. To permit movement of the flag between the upper and lower compartments of the housing section, the partition member 40 is slotted at 64, in line with the slot 63.

As best shown in FIGURES 2 and 3, the coupling member 31 is shaped somewhat like a square frame, and fits loosely over the outside of the housing sections so that it can be moved freely along the length thereof. The bottom piece of the member 31 has arcuate recesses 65 formed in opposite sides thereof to provide clearance for the filler caps 15 when the coupling member 31 is moved towards one or the other filler cap, for the purpose of disconnecting the housing sections. An angle bracket 66 projects laterally from one of the bottom corners of the member 31 to provide a holder for supporting wires 70, 72 leading from the lamp socket 44 to the other end of the housing, where they join with other wires 71 coming from the photoelectric cell 51, which then lead to the electrical circuit.

The preferred electrical circuit is depicted schematically in FIGURE 5. As shown in the circuit diagram, one side of the filament of lamp 45 is connected by wire 70 to the positive terminal of the battery 10, while the other side of the lamp filament is connected by wire 72, which goes to one side of the photoelectric cell 51. The photoelectric cell 51 is preferably of the photoconductive type using germanium or the like, in which the electrical resistance of the cell is greatly reduced when exposed to light. The photoelectric cell 51 is connected by a wire 73 to the base 74 of a p-n-p transistor 75. The emitter 76 of the transistor is connected to the positive terminal of the battery, and the collector 77 is connected to the coil 78 of a relay 79. The relay coil 78, when energized, opens a movable switch blade 80, which is normally spring-closed against a stationary contact 81. The switch blade 80 is connected to the positive terminal of the battery 10, and the stationary contact 81 is connected to one side of the filament of the indicator lamp 22; the other side of the filament being connected by wires 83 and 84 to the negative terminal of the battery. Switch 23 is connected between the wires 83, 84, and is normally closed when the system is in operation.

The operation of the invention is as follows: Switch 23 is closed to activate the warning device of the present invention. As mentioned earlier, switch 23 may be either a manually operated switch, or it may be embodied in the ignition switch, so that when the ignition is turned on, the indicator device is actuated. If the acid level in all cells of the battery is up to a safe level, the floats 60 will elevate all of the flags 62 into the upper compartments of the housing sections, leaving an unobstructed path for the light from the lamp 45 to the photoelectric cell 51. Closing the switch 23 causes the lamp 45 to light up, and the light passes through the transparent blocks of plastic 42 to the photoelectric cell 51. Upon being illuminated by light from the lamp 45, the photoelectric cell 51 has its internal resistance reduced from one megohm or more down to a much lower resistance, such as 10,000 ohms or so, which causes current to flow through the base 74 of the transistor 75. This electrical signal to the base causes the transistor to be activated, and a substantial flow of current flows from the emitter 76 to the collector 77, and thence through the relay coil 78, causing the switch 80 to open. At the time the switch 23 is closed, the lamp 22 lights up momentarily, and then goes out. This indicates to the driver that the system is working, and that the battery acid is up to a satisfactory level in all cells of the battery. If any one of the cells should be low, it associated flag 62 will be positioned in the lower half of the housing section, where it blocks the path of light from the lamp 45 to the photoelectric cell. Thus, when the photoelectric cell 51 is no longer illuminated, the flow of current to the base 74 of the transistor is stopped, causing the flow of current from the emitter 76 and collector 77 to stop. This de-energizes the relay coil 78, and allows the switch 80 to close against the contact 81, thereby lighting up the indicator lamp 22. Upon seeing that the lamp 22 is lighted up, the operator is alerted to the fact that at least one cell of the battery is low and should be refilled.

Another embodiment of the elecrtical circuit to actuate the signaling device is shown in FIGURE 6. In this form of the invention, the relay 78 is omitted, and a heavy-duty transistor 90 is used, which supplies the current to light up the lamp 22'. As in the previously described embodiment, the output wire 73' from the photoelectric cell 51' goes to the base 74' of the transistor 90, causing a greatly amplified current to flow from the emitter 76' to the collector 77', and thence to the filament of the lamp 22'. In this instance, the lamp 22' remains lighted at all times when the acid level in the battery cells is up to a safe level, and only goes out when the acid level in one of the cells drops below the safe level. Since the lighted lamp 22' indicates that the battery is in good condition, it should preferably be colored green, whereas the lamp 22 of the first-described embodiment would preferably be colored red.

While I have shown and described in considerable detail what I believe to be the preferred form of my invention, it will be understood by those skilled in the art that various changes may be made in the shape and arrangement of the several parts without departing from the broad scope of the invention as defined in the following claims. For example, an n-p-n type of transistor could be substituted for the p-n-p type used at 75, with corresponding changes in the circuit to meet the electrical requirements of this alternate type of transistor. It will also be obvious to those skilled in the art, that the relay 79 could be modified so that the switch blade 80 is closed against the stationary contact 81 when the coil 78 is energized, and is spring-opened when the coil is de-energized. In this case, the lamp 22 would remain lighted at all times when the switch 23 is closed and all battery cells are up to safe level, and the lamp 22 would therefore preferably be green in color, to indicate a safe condition.

I claim:

1. In combination, a battery having a case divided into a plurality of electrolyte-containing cells, each of which has a filler opening;
   a housing mounted on the top of the battery case above said filler openings;
   said housing having a light-conducting channel provided therein which extends from one end of the housing to the other;
   a lamp mounted at one end of said housing to direct rays of light along said channel to the other end of the housing;
   a photoelectric cell mounted at said other end of said housing in a position to be energized by rays of light from said lamp passing through said light-conducting channel;
   a plurality of floats disposed one in each of said cells, each of said floats having a stem projecting upwardly through its filler opening;
   an opaque flag carried at the upper end of each of said stems, said flags being normally positioned above said light-conducting channel when the electrolyte level of the associated cell is above the safe level, and said flag descending into said light-conducting channel when the electrolyte level drops below said safe level;
   any one of said flags being operable to interrupt the rays of light from said lamp to said photoelectric cell when the electrolyte level of the associated cell drops below the safe level;
   an electrically actuated indicating device; and
   a transistor operatively connected to said indicating device to actuate the same;
   said transistor being connected to said photoelectric cell and energized thereby to actuate said indicating device when the rays of light from said lamp are interrupted by one of said flags.

2. In combination, a battery having a case divided into a plurality of electrolyte-containing cells, each of which has a filler opening;
   a housing mounted on the top of the battery case above said filler openings;
   said housing having a light-conducting channel provided therein which extends from one end of the housing to the other;
   a lamp mounted at one end of said housing to direct rays of light along said channel to the other end of the housing;
   a photoelectric cell mounted at said other end of said housing in a position to be energized by rays of light from said lamp passing through said light-conducting channel;
a plurality of floats disposed one in each of said cells, each of said floats having a stem projecting upwardly through its filler opening;
an opaque flag carried at the upper end of each of said stems, said flags being normally positioned above said light-conducting channel when the electrolyte level of the associated cell is above the safe level, and said flag descending into said light-conducting channel when the electrolyte level drops below said safe level;
any one of said flags being operable to interrupt the rays of light from said lamp to said photoelectric cell when the electrolyte level of the associated cell drops below the safe level;
an indicating device;
a circuit connecting said indicating device to said battery, and including a relay having a normally closed switch which is opened when the relay is energized; and
a transistor operable to energize said relay responsive to electrical current from said photoelectric cell when the latter is illuminated by said lamp, thereby opening said relay switch to inactivate said indicating device;
said transistor being operable to de-energize said relay responsive to interruption of the electrical current from said photoelectric cell when the light from said lamp is interrupted by one of said flags, thereby closing said relay switch and activating said indicating device to signify to the operator that the electrolyte level in one of the battery cells is low.

3. In combination, a battery having a plurality of electrolyte-containing cells, each of which has a filler opening;
a photoelectric cell;
a lamp disposed to shine a beam of light on said photoelectric cell and energize the same;
a plurality of floats disposed one in each of said cells, each of said floats having a stem projecting upwardly through its filler opening;
an opaque flag carried at the upper end of each of said stems, said flags being normally displaced from the light beam when the electrolyte level of the associated cell is above the safe level;
said flags being moved into the light beam to interrupt the same when the electrolyte level drops below the safe level;
an electrically actuated indicating device;
a transistor electrically connected to said photoelectric cell to be actuated thereby; and
means actuated by current from said transistor to activate said indicating device when one of said flags interrupts said light beam, thereby signifying to the operator that the electrolyte level in one of the battery cells is low.

4. A battery electrolyte level indicator, as set forth in claim 3, in which said last-named means includes a relay having a normally closed switch connected in series with said indicating device, said switch being opened by said relay when the latter is energized, and said relay being energized by current from said transistor only when said photoelectric cell is illuminated by said lamp.

5. In combination, a battery having a plurality of electrolyte-containing cells, each of which has a filler opening;
a photoelectric cell;
a lamp disposed to shine a beam of light on said photoelectric cell and thereby energize the same;
a plurality of floats disposed one in each of said cells, each of said floats having a stem projecting upwardly through its filler opening;
an opaque flag carried at the upper end of each of said stems, said flag being normally displaced from the light beam when the electrolyte level of the associated cell is above the safe level;
said flags being moved into the light beam to interrupt the same when the electrolyte level drops below the safe level;
an electrically actuated indicating device;
a transistor connected to said photoelectric cell and to said indicating device, said transistor being operable to deliver an amplified current flow to said indicating device only when said photoelectric cell is illuminated by said lamp;
said indicating device being activated by said amplified current from said transistor to signify to the operator that the electrolyte level in all cells of said battery is up to the safe level.

References Cited by the Examiner
UNITED STATES PATENTS

| | | | |
|---|---|---|---|
| 1,643,238 | 9/1927 | Curtis. | |
| 1,719,160 | 7/1929 | Zagarino et al. | |
| 1,911,811 | 5/1933 | Coote. | |
| 2,561,748 | 7/1951 | Murphy | 136—182.2 |
| 3,065,354 | 11/1962 | Bird | 73—293 |
| 3,196,357 | 7/1965 | Hoag | 136—182 |

WINSTON A. DOUGLAS, *Primary Examiner.*
D. L. WALTON, *Assistant Examiner.*